UNITED STATES PATENT OFFICE.

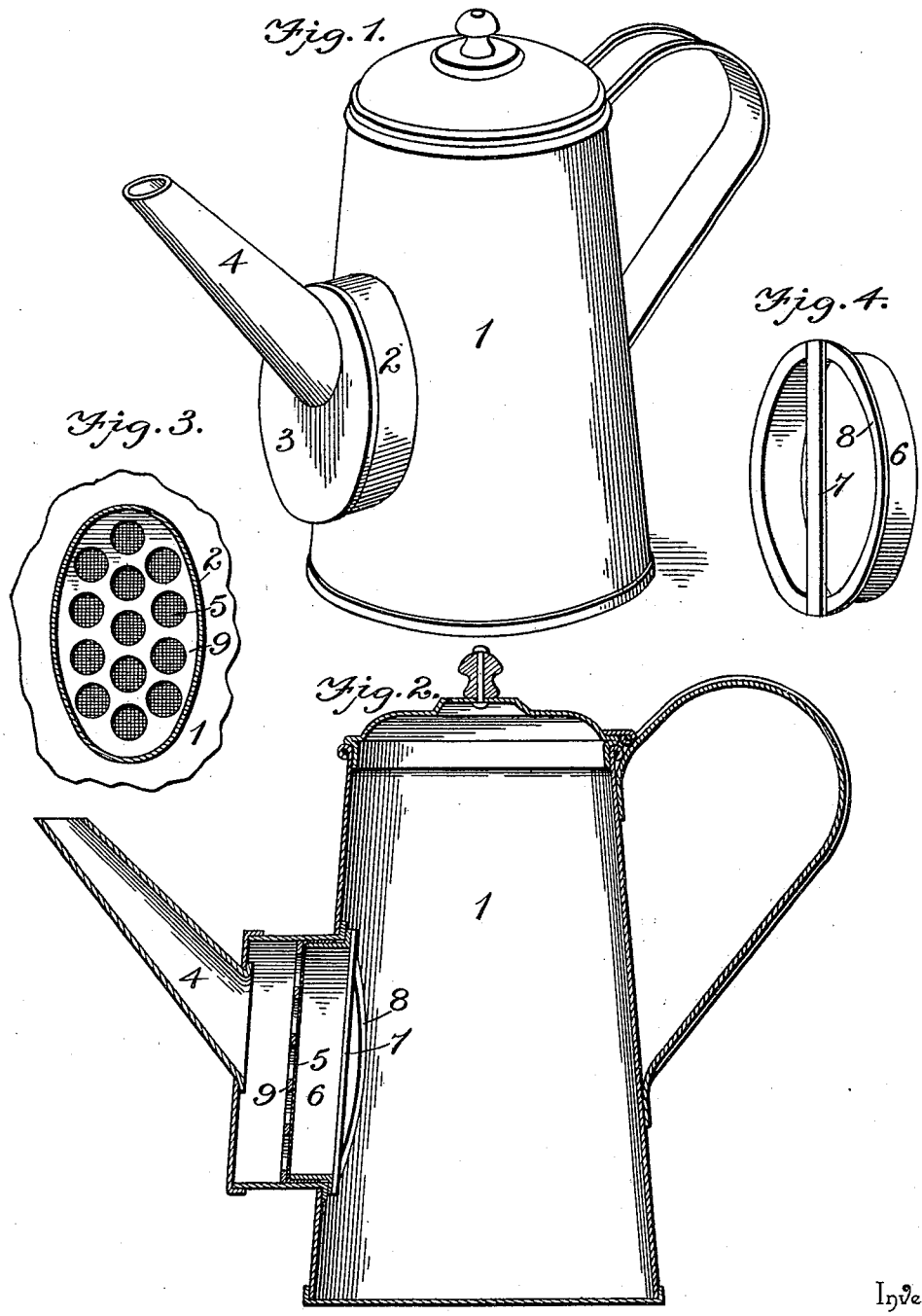

ROBERT NELSON HARRIS, OF HICKORY, NORTH CAROLINA.

COFFEE-POT.

SPECIFICATION forming part of Letters Patent No. 583,470, dated June 1, 1897.

Application filed March 10, 1897. Serial No. 626,811. (No model.)

*To all whom it may concern:*

Be it known that I, ROBERT NELSON HARRIS, a citizen of the United States, residing at Hickory, in the county of Catawba and State of North Carolina, have invented a new and useful Coffee-Pot, of which the following is a specification.

The invention relates to improvements in coffee-pots.

The object of the present invention is to provide for coffee-pots a straining device which will be simple and inexpensive in construction, adapted to remain permanently within a coffee-pot without decreasing the capacity of the same or in any manner interfering with the making of coffee, and capable of effectively straining the same.

The invention consists in the construction and novel combination and arrangement of parts, as herein fully described, illustrated in the drawings, and pointed out in the claim hereto appended.

In the drawings, Figure 1 is a perspective view of a coffee-pot constructed in accordance with this invention. Fig. 2 is a vertical sectional view of the same. Fig. 3 is a detail sectional view of the strainer-casing, the foraminous diaphragm being shown in elevation. Fig. 4 is a detail perspective view of the removable rim.

Like numerals of reference designate corresponding parts in the several figures of the drawings.

1 designates a coffee-pot having an enlarged discharge-opening, and mounted on the exterior of the coffee-pot at the discharge-opening thereof is a substantially elliptical casing 2, consisting of curved sides and a vertical outer wall 3. The outer wall of the casing is provided near the top thereof with an opening, and a spout 4 is mounted on the casing at such opening.

The casing 2, which receives the strainer, enables the same to be arranged within the coffee-pot without lessening the capacity thereof and without interfering with the making of the coffee. The strainer consists of a piece of fabric 5, stretched over a removable rim 6 and consisting, preferably, of stout cloth, which will be found most effective, as the strainer-casing is sufficiently larger than the diameter of the spout to enable coffee to percolate through such a straining-cloth as rapidly as desirable; furthermore, such a cloth will last for a considerable length of time and the strainer does not have to be removed until the cloth becomes worn.

The removable rim, over which the strainer-cloth is stretched, is provided with a vertical bar or cross-piece 7, which serves as a handle, and the outer edge of the rim is provided with a flange 8, which engages the inner face of the coffee-pot. In order to prevent the strainer-cloth from sagging, the strainer-casing is provided with a foraminous diaphragm 9, against which the inner edge of the removable rim bears. This foraminous diaphragm is preferably constructed of sheet metal provided with large perforations, as shown, but wire-gauze or any other suitable material may be employed, if desired. The strainer-cloth bears against the inner face of the foraminous diaphragm, which is disposed vertically at about the center of the strainer-casing.

It will be seen that the straining device is simple and inexpensive in construction, that it does not decrease the capacity of the coffee-pot and is not in the way, and that it forms an effective strainer. It will also be apparent that the strainer may remain within the coffee-pot and does not require any attention until the cloth becomes worn, that it improves the flavor of the coffee, as it absolutely prevents any of the grounds from leaving the coffee-pot, and that it may be readily washed without removing it from the casing; also, the strainer is applicable to teapots and other vessels where such a device is desirable.

What I claim is—

In a device of the class described, the combination with a vessel provided at one side with an enlarged opening, a strainer-casing mounted on the exterior of the vessel at the discharge-opening and comprising sides and a front wall having an opening, a spout mounted on the strainer-casing at the opening thereof, a vertical foraminous diaphragm arranged within the strainer-casing, a strainer-cloth supported by the diaphragm, and a removable rim fitting within the casing and stretching the strainer-cloth on the diaphragm, substantially as described.

In testimony that I claim the foregoing as my own I have hereto affixed my signature in the presence of two witnesses.

ROBERT NELSON HARRIS.

Witnesses:
H. E. McCOMB,
A. W. CHANCE.